(12) United States Patent
Lawall et al.

(10) Patent No.: US 8,100,471 B2
(45) Date of Patent: Jan. 24, 2012

(54) ADJUSTABLE SEAT RAMP UTILIZING ACTIVE MATERIAL ACTUATION

(75) Inventors: Jennifer P. Lawall, Waterford, MI (US);
Steven E. Morris, Fair Haven, MI (US);
Diane K. McQueen, Leonard, MI (US);
Paul W. Alexander, Ypsilanti, MI (US);
Nancy L. Johnson, Northville, MI (US);
Alan L. Browne, Grosse Pointe, MI (US);
Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 304 days.

(21) Appl. No.: 12/392,103

(22) Filed: Feb. 25, 2009

(65) Prior Publication Data
US 2009/0218859 A1 Sep. 3, 2009

Related U.S. Application Data

(60) Provisional application No. 61/033,016, filed on Mar. 3, 2008.

(51) Int. Cl.
*B60N 2/42* (2006.01)
*B60N 2/02* (2006.01)
*B60R 21/00* (2006.01)

(52) U.S. Cl. ............ 297/216.1; 297/216.19; 297/284.11; 297/313

(58) Field of Classification Search ................ 297/216.1, 297/216.19, 284.11, 313
See application file for complete search history.

(56) References Cited

U.S. PATENT DOCUMENTS

| 4,334,709 | A | * | 6/1982 | Akiyama et al. | .......... 297/284.11 |
| 5,695,242 | A | * | 12/1997 | Brantman et al. | .......... 297/216.1 |
| 5,908,219 | A | * | 6/1999 | Bohmler | ................ 297/216.1 |
| 6,086,097 | A | * | 7/2000 | Van Wynsberghe | .......... 280/748 |
| 6,382,491 | B1 | | 5/2002 | Hauser et al. | |
| 7,150,500 | B2 | * | 12/2006 | Hippel et al. | .............. 297/216.1 |
| 7,758,121 | B2 | * | 7/2010 | Browne et al. | ........... 297/284.11 |
| 7,814,810 | B2 | * | 10/2010 | Mitteer | .................... 74/473.1 |
| 2007/0080013 | A1 | * | 4/2007 | Melz et al. | ................ 180/274 |

FOREIGN PATENT DOCUMENTS

| JP | 08-119011 A | 5/1996 |
| JP | 2891290 B2 | 2/1999 |

* cited by examiner

*Primary Examiner* — David Dunn
*Assistant Examiner* — Philip Gabler

(57) ABSTRACT

An adjustable seat ramp adapted for use with a seat base and defining a first angle of inclination, includes a structure translatably disposed within or integrally formed with the base and presenting a first position, and further includes an actuator employing a shape memory material element and configured to cause the structure to translate to a second position, wherein a second angle of inclination is defined.

8 Claims, 6 Drawing Sheets

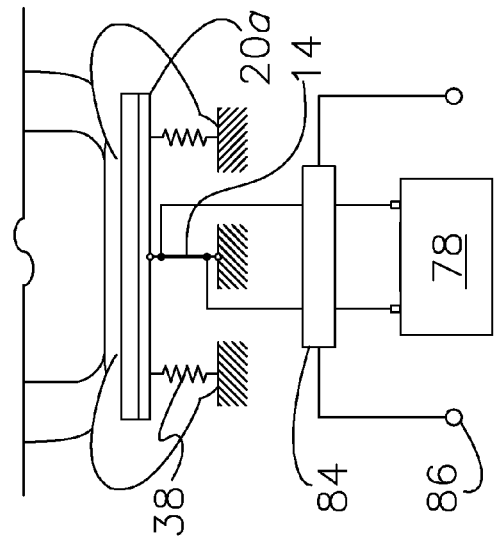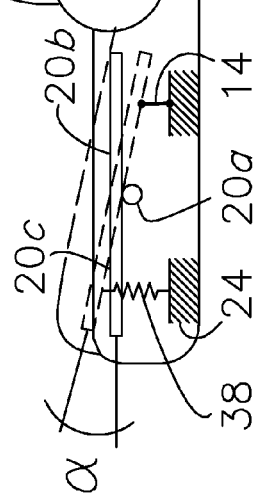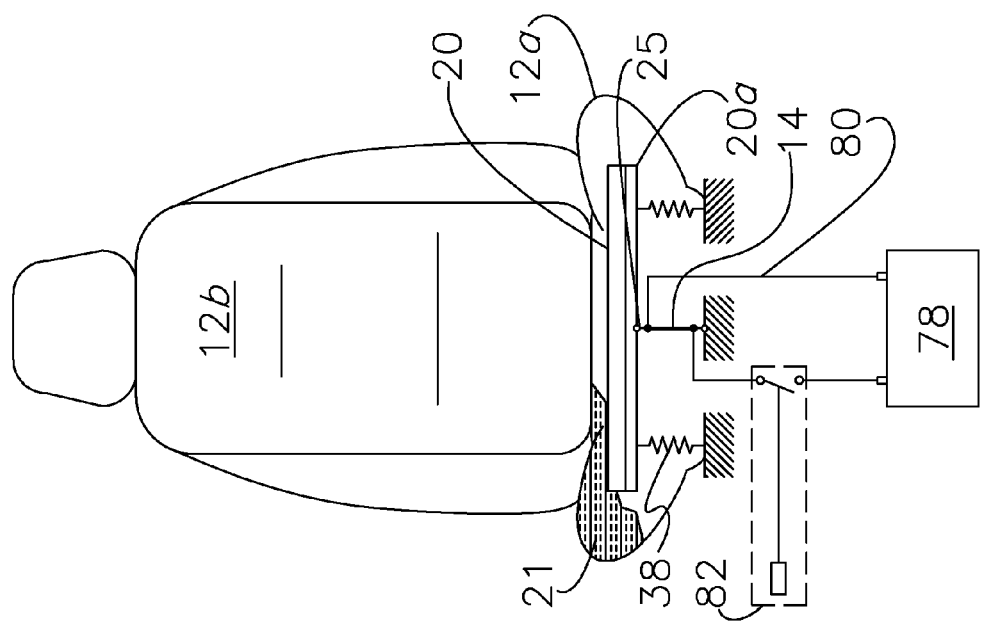

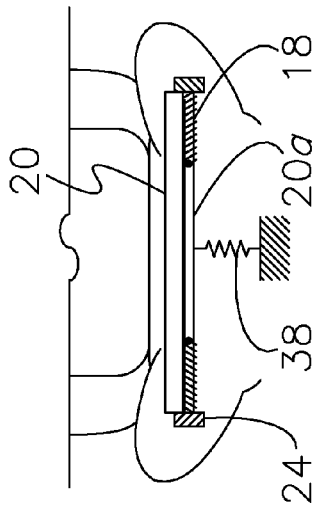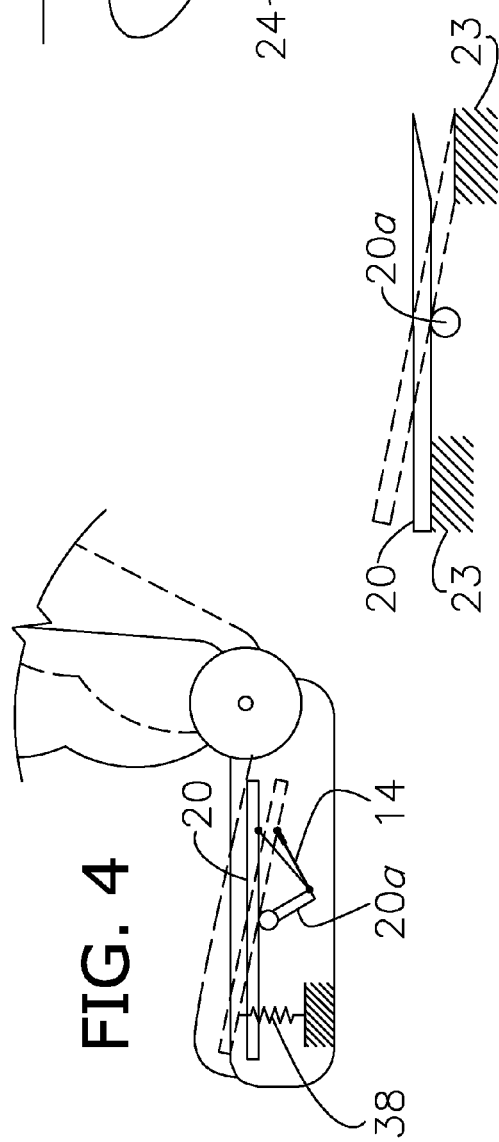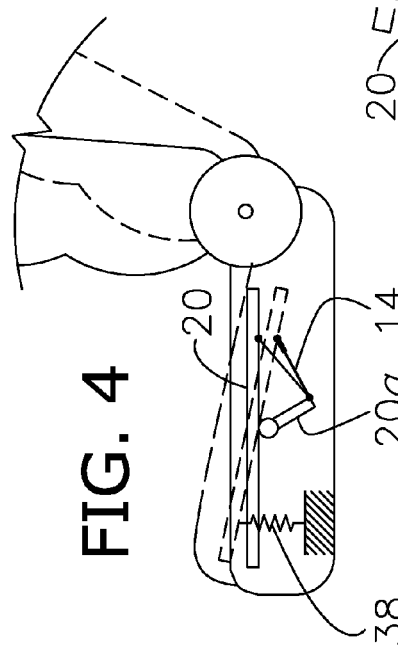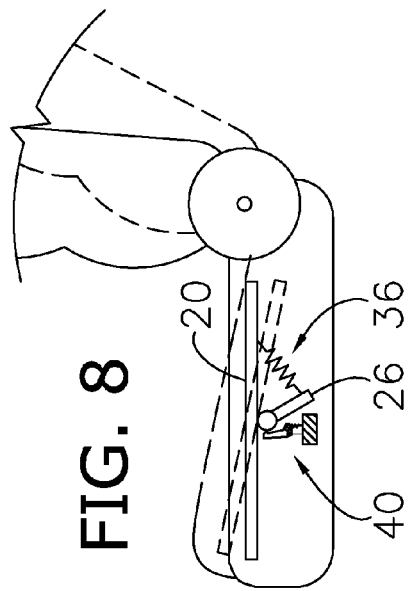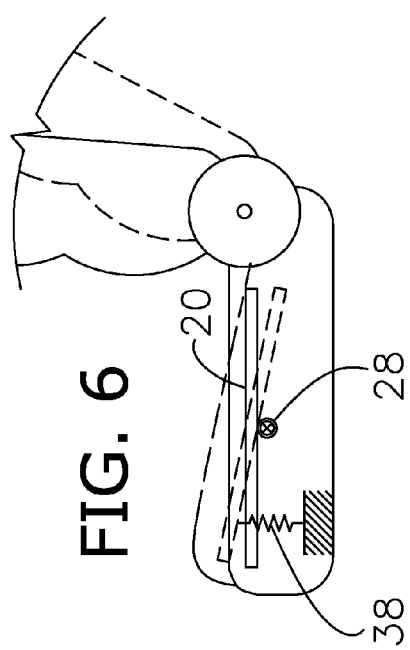

ADJUSTABLE SEAT RAMP UTILIZING ACTIVE MATERIAL ACTUATION

RELATED APPLICATIONS

This patent application makes reference to, claims priority to, and claims benefit from U.S. Provisional Patent Application Ser. No. 61/033,088, entitled "ACTIVE MATERIAL ACTUATED SEAT RAMP," filed on Mar. 3, 2008.

BACKGROUND OF THE INVENTION

1. Field of the Invention

The present disclosure generally relates to a seat ramp adapted for use with a seat base, and more particularly, to an adjustable seat ramp having an active memory material based actuator that is operable to change a condition of the seat base.

2. Discussion of Prior Art

Seat ramps are incorporated within seat bases to provide an elevated distal edge relative to the interior region of the base. This promotes improved ergonomics, and comfort, especially where the ramp cooperatively presents a minimum (e.g., 15°) angle of inclination that better supports the occupant. In an automotive setting, ramps further provide a means for reducing potential concerns relating to sudden stop conditions. More particularly, it is appreciated that the angle of inclination defined thereby causes a portion of the energy transposed upon the occupant or object during abrupt vehicle deceleration to be dissipated by the base, which deters "submarining" (i.e., the passing of an occupant under the seat belt during a crash event).

Whereas differing angles of inclination promote comfort under normal conditions, and safety under sudden stop conditions, concerns relating to one-size-fits-all configuration of conventional seat ramps are appreciated in the art. Of further concern, these configurations are typically non-adjustable and therefore unable to account for occupant size, and/or preference. As a result, deployable or modifiable seat ramps have more recently been developed. However, due to complex architecture, including mechanical, electromechanical (e.g., motors, solenoids, etc.), pneumatic/hydraulic (e.g., bladders, air-cylinders, etc.), and inflatable foam actuation, they have achieved minimal application and use.

BRIEF SUMMARY OF THE INVENTION

The present invention addresses these concerns, and recites an adjustable seat ramp that utilizes active material actuation to more efficiently effect adjustment. The invention is useful for improving occupant kinematics, ergonomics, and comfort by providing a seat base that is adjustable according to the size or preference of the occupant. The inventive ramp is able to selectively achieve at least first and/or second positions on demand; and, more preferably, comprises a smart system able to autonomously effect adjustment, when advantageous. In an automotive setting, this invention provides means for changing the distribution of the forces acting on and thus the kinematics of belted occupants during impact events.

In general, an adjustable seat ramp adapted for use with a seat base defining an engagement surface is disclosed. The surface defines a distal edge relative to and an interior region adjacent the seat upright. The edge and region cooperatively define a first height and angle of inclination. The inventive ramp includes a structure translatably disposed within or integrally formed with the base, and presenting a first position or orientation relative to the surface. The ramp further includes an actuator drivenly coupled to the structure, and employing an active material element, such as a shape memory alloy, EAP, or piezo ceramic, operable to undergo a reversible change when exposed to or occluded from an activation signal. The actuator is configured to cause the structure to translate to a second position or orientation, and the structure and base are cooperatively configured to modify the elevation of the edge or region, so as to define a second height or angle of inclination different from the first, as a result of the change.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 2a is a front elevation of an automotive seat ramp system including an adjustable structure disposed within the base, a shape memory material based actuator, return springs, a signal source, and a switch/input device communicatively to the source, in accordance with a preferred embodiment of the invention;

FIG. 2b is a side elevation of the system shown in FIG. 2a, omitting the source and switch, in accordance with a preferred embodiment of the invention;

FIG. 2c is a front elevation of the system shown in FIG. 2a, wherein the switch has been replaced by first and second sensors and a controller, in accordance with a preferred embodiment of the invention;

FIG. 3 is an elevation of a pivotal planar structure engaging front and rear base supports in first and second positions, in accordance with a preferred embodiment of the invention;

FIG. 4 is an elevation of an adjustable ramp system, including a planar structure having a pivot tube, and a fixed member distending from and rotatably coupled to the tube, and a shape memory alloy wire interconnecting the structure and member, FIG. 5 is a front elevation of an actuator including alternatively a spring coil stored energy element or a spooled shape memory wire, drivenly coupled about the pivot tube of the structure, in accordance with a preferred embodiment of the invention;

FIG. 6 is a side elevation of an adjustable ramp system, wherein the actuator includes an SMA torque tube, in accordance with a preferred embodiment of the invention;

FIG. 8 is a partial side elevation of an actuator including an extension spring stored energy element drivenly coupled to a fixed member of the planar structure, in accordance with a preferred embodiment of the invention;

DETAILED DESCRIPTION OF THE INVENTION

Figure 1:
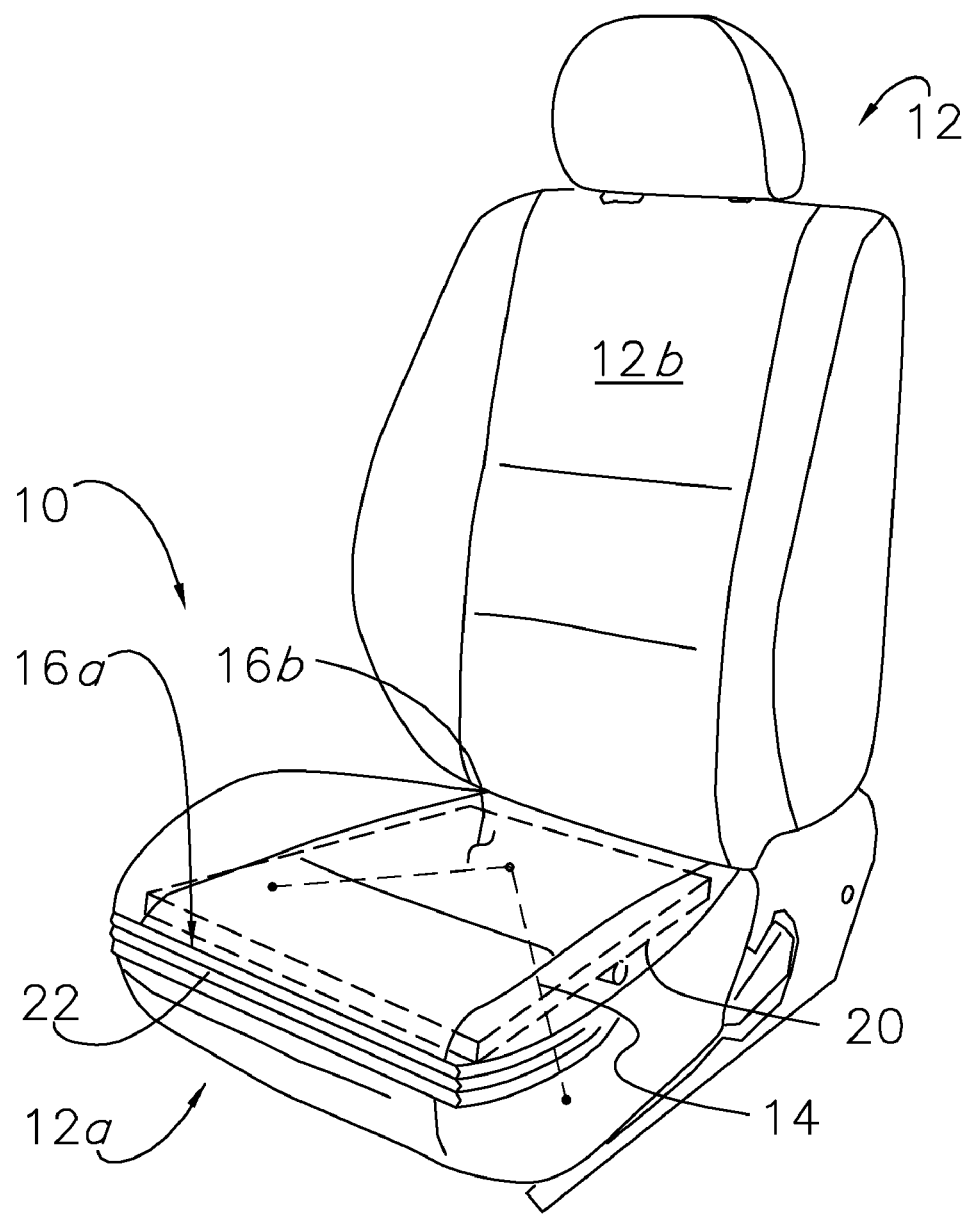
FIG. 1 is a perspective view of an automotive seat having a base and upright, particularly illustrating an adjustable ramp disposed with the base, in accordance with a preferred embodiment of the invention.

The following description of the preferred embodiments is merely exemplary in nature and is in no way intended to limit the invention, its application, or uses. The invention is described and illustrated with respect to an automotive seat ramp 10 (FIGS. 1-12b); however, it is well appreciated that the benefits of the invention may be utilized variously with other types of seats (or furniture), including reclining sofas, airplane seats, and child seats. The invention general recites an adjustable seat ramp system (i.e., "ramp") 10 adapted for use with a seat 12 comprising a base 12a and upright 12b (FIG. 1). The ramp 10 is drivenly coupled to, so as to be causable to change in geometric configuration (or orientation, etc.) by, an active material element 14 able to rapidly generate measurable displacement.

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Suitable active materials for use with the present invention include but are not limited to shape memory alloys, ferromagnetic shape memory alloys, shape memory polymers, electroactive polymers (EAP), and piezo-electric ceramics. As it is appreciated that these types of active materials have the ability to rapidly displace, or remember their original shape and/or elastic modulus, which can subsequently be recalled by applying an external stimulus. As such, deformation from the original shape is a temporary condition. In this manner, an element composed of these materials can change to the trained shape in response to either the application or removal (depending on the material and the form in which it is used) of an activation signal.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be pseudo-plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force if it is judged that there is a need to reset the device.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable.

Stress induced phase changes in SMA, caused by loading and unloading of SMA (when at temperatures above $A_f$), are, however, two way by nature. That is to say, application of sufficient stress when an SMA is in its austenitic phase will cause it to change to its lower modulus martensitic phase in which it can exhibit up to 8% of "superelastic" deformation. Removal of the applied stress will cause the SMA to switch back to its austenitic phase in so doing recovering its starting shape and higher modulus.

Ferromagnetic SMA's (FSMA's) are a sub-class of SMAs. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for rail filling applications. External magnetic fields are generally produced via soft-magnetic core electromagnets in automotive applications, though a pair of Helmholtz coils may also be used for fast response.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. With respect to the present invention, it is appreciated that electroactive polymers may be fabricated and implemented as a thin film defining a preferred thickness below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Finally, it is appreciated that piezoelectric ceramics can also be employed to produce force or deformation when an electrical charge is applied. PZT ceramics consist of ferroelectric and quartz material that are cut, ground, polished, and otherwise shaped to the desired configuration and tolerance. Ferroelectric materials include barium titanate, bismuth titanate, lead magnesium niobate, lead metaniobate, lead nickel niobate, lead zinc titanates (PZT), lead-lanthanum zirconate titanate (PLZT) and niobium-lead zirconate titanate (PNZT). Electrodes are applied by sputtering or screen printing processes, and then the block is put through a poling process where it takes on macroscopic piezoelectric properties. Multi-layer piezo-actuators typically require a foil casting process that allows layer thickness down to 20 μm. Here, the electrodes are screen printed, the sheets laminated, and a compacting process increases the density of the green ceramics and removes air trapped between the layers. Final steps include a binder burnout, sintering (co-firing) at temperatures below 1100° C., wire lead termination, and poling.

Returning to FIGS. 1-12b, the active seat ramp 10 is employed by an automotive seat base 12a that defines an exterior engagement surface 16. The surface 16 defines a distal edge 16a relative to and an internal region 16b adjacent the upright 12b (FIG. 1). The ramp 10 includes an actuator 18 operable to autonomously change a condition, such as the geometric configuration or orientation of the surface 16.

In FIG. 1-8, the ramp 10 includes a moveable planar structure (or "panel") 20 disposed within the base 12a. The structure 20 is formed of a stiff material, such as rigid plastics, metals, etc. sufficient to support the weight of the occupant. The structure 20 may be enveloped by a cushion layer 21 and may be integrally formed therewith.

The structure 20 is moveable (e.g., linearly or rotationally moveable, reconfigurable, shiftable, etc.) between first and second positions (e.g., shapes, configurations, orientations, etc.) relative to the surface 16, wherein each position is operable to modify the existing elevation of the edge 16a and/or region 16b, so as to present a different height or angle of inclination. As such, the preferred seat base 12a further presents a flexible (e.g., stretchable, extendable, etc.) outer covering section 22 adjacent the edge 16a, such as the accordion section shown in FIG. 1, to facilitate raising and lowering the edge 16a.

In FIG. 1-8, the structure 20 is pivotally connected to the base 12a, and includes a pivot tube, and more preferably, a spring-loaded pivot tube, 20a that defines a pivot axis. The pivot axis is preferably located centrally along the ramp 10, so as to define proximate and distal halves 20b,c (or otherwise portions) relative to the upright 12b (FIG. 2b). In the first position, the panel 20 presents a generally horizontal orientation, wherein it exerts no force upon the distal edge 16a (FIG. 2a). In this position, it is appreciated that the normal angle of inclination and camber of the base 12a is unchanged.

In the second position, the structure 20 presents a sloped orientation, and more preferably, presents an angle of inclination, α, of at least 15°, as measured from the upright 12b (FIG. 2b). Here, the surface 16 is modified by the structure 20, which acts upon it, such that the edge 16a and region 16b define a second height greater than the first. To support the structural capacity of the structure 20, the preferred base 12a further includes supports 23 configured to alternatively engage the panel 20 in the first and second positions (FIG. 3). As shown in the illustrated embodiment of FIG. 3, the panel structure 20 is preferably beveled along its proximate edge, so as to enable flush engagement with the support 23 when in the raised (e.g., second) position.

Alternatively, the structure 20 may take other geometric forms, such as a slatted panel, or frame. As shown in FIGS. 9a-12b, it is also appreciated that the entire base 12a itself may be manipulated, wherein the surface 16 is re-oriented instead of reconfigured. For example, the pivot axis may be defined at the distal edge 16a, and the angle of inclination increased by causing or enabling the region 16b to be lowered.

As previously mentioned, the actuator 18 includes an active material element 14 operable to undergo a reversible change in fundamental property when exposed to or occluded from an activation signal. The element 14 presents sufficient actuation force to cause the ramp 10 to move to one of the positions when activated, and may be configured to directly or indirectly drive manipulation. It is appreciated that the gauge, cross-sectional area, length, and/or otherwise configuration of the element 14 necessary to effect the actuation force, based on the active material employed, is readily determinable by those of ordinary skill in the art, and as such, the selection criteria will not be described in detail herein. For example, in FIGS. 2-5, actuator 18 is shown generally consisting of a linearly acting SMA wire 14. As used herein the term "wire" is used in a non-limiting sense, and encompasses other equivalent geometric configurations such as bundles, braids, cables, ropes, chains, strips, etc.

As shown in FIGS. 2a,b, for example, the wire 14 may be fixedly connected to the bottom surface of the proximate half 20b of the structure 20, and oppositely to a fixed anchor 24 preferably within the seat 12. More preferably, the wire 14 is connected to the frame 20 at its ends, and medially coupled to the structure 20, so as to form a vertex therewith, and a bow-string configuration (FIG. 1). In this configuration, it is appreciated that wire activation results in amplified displacement at the vertex due to the trigonometric relationship presented. The wire 14 is preferably connected to the structure 20, fixed (to vehicle) member 26, and anchors 24 through reinforcing structural fasteners (e.g., crimps, etc.) 25, which facilitate and isolate mechanical and electrical connection.

When the wire 14 is caused to contract, it pulls the structure 20 causing it to pivot clockwise about the axis and achieve the second position. It is appreciated that the spacing between the point of connection and axis contributes to the amount of actuation force required as well as the amount of displacement. Moreover, for tailored force and displacement performance, the actuator 18 may include a plurality of active material elements 14 configured electrically or mechanically in series or parallel, and mechanically connected in telescoping, stacked, or staggered configurations. The electrical configuration may be modified during operation by software timing, circuitry timing, and external or actuation induced electrical contact.

In another embodiment shown in FIG. 4, the structure 20 may further include a fixed member 26 rotatably connected to the tube 20a and traversely distending from the structure 20. Here, the wire 14 interconnects the bottom surface of the proximate half 20b of the structure 20 and the distal end of the member 26, so as to present a self-contained system 10. When activated, the wire 14 contracts causing the proximate half 20b to swing towards the member 26, thereby raising the distal edge 16a of the surface 16 and increasing the height of the ramp 10 (FIG. 3b). Moreover, it is appreciated that causing the proximate half 20b of the structure 20 to recess within the base 12a, enables the occupant or object to sink into the seat 12, which further increases the height of the ramp 10.

Alternatively, the actuator 18 may spool the SMA wire 14 about the pivot tube 20a (alternately shown in FIG. 5), combine the pivot tube 20a with SMA actuation to effect an SMA based torque tube 28 (FIG. 6), or employ an EAP roll actuator operable to selectively cause the structure 20 to rotate by generating a moment about the pivot axis.

Figure 7:
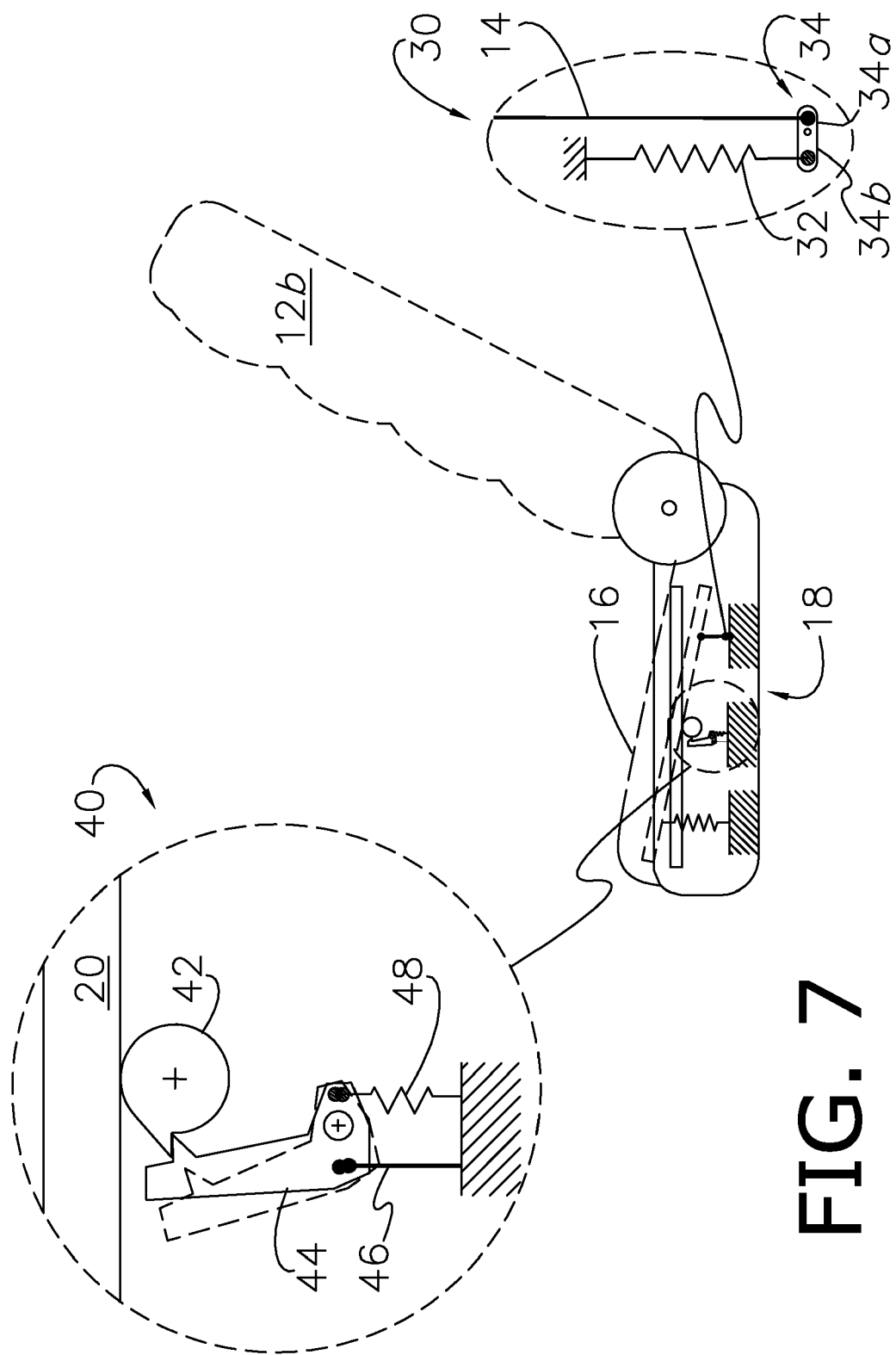
FIG. 7 is a side elevation of an adjustable ramp system, particularly illustrating a planar structure, a pivot tube, a shape memory wire actuator, return springs, and in enlarged caption view, an overload protector coupled to the wire, and a locking mechanism engaging the tube, in accordance with a preferred embodiment of the invention.

As shown in FIG. 7, the actuator 18 further may, but not necessarily, include an overload protector 30 connected to the element 14 opposite the structure 20. The overload protector 30 is configured to present a secondary output path, when the element 14 is activated but the structure 20 is unable to be moved, e.g., when the weight distribution of the occupant predominately acts upon the distal half 20c of the structure 20. In the illustrated embodiment, the overload protector 30 includes an extension spring 32 connected in series to the element 14. The spring 32 is stretched to a point where its applied preload corresponds to the load level where it is appreciated that the actuator element 14 would begin to experience excessive force if blocked. As a result, activation of the element 14 will first apply a force trying to manipulate the structure 20, but if the force level exceeds the preload in the spring 32 (e.g., the ramp 10 is blocked), the wire 14 will instead further stretch the spring 32, thereby preserving the integrity of the actuator 18.

The preferred protector 30 provides mechanical advantage, and to that end, may further include a lever 34 intermediate the element 14 and spring 32 (FIG. 7). The lever 34 defines first and second arms 34a,b and a pivot axis. The element 14 is attached to one of the arms 34a,b, so as to be spaced from the axis a first distance. The spring 32 is attached to the other arm and spaced from the axis a second distance greater than the first, so as to increase the overload force required to further stretch the spring 32.

In a preferred embodiment, the actuator 18 further includes a stored energy element 36 intermediate the active material element 14 and structure 20 (FIG. 8). The stored energy element 36 is operable to release stored energy when the active material element 14 is activated, and to manipulate the structure 20, as a result of releasing the energy. For example, the stored energy element 36 may consist of a spring coil (or clock spring) engaged with, and caused to wind by, the pivot tube 20a when in the first position (as alternately shown in FIG. 5). Alternatively, the stored energy element 36 may be presented by an extension spring 36 interconnected to the proximate half 20b of the structure 20 and the member 26 or base 12a (FIG. 8). In these configurations, activation of the active material functions to release or unlock the structure 20, e.g., so as to allow its rotation by the spring 36.

It is appreciated that return of the structure 20 to the original (e.g., horizontal) position may be passively effected, e.g., by manual manipulation, or the weight of the occupant; or actively, by a two-way shape memory element 14. Where the element 14 presents one-way actuation, however, a separate return mechanism (i.e., "return") 38 is preferably provided to generate a biasing force towards return. In this configuration, the return mechanism 38 is drivenly coupled to the structure 20, acts antagonistically to the actuator 18, and as shown in the illustrated embodiment, may be embodied by a compression, extension, or torsion spring, elastomer, pneumatic/hydraulic springs, elastomeric components (e.g., snubbers), counterweights, and an additional active material element, or the like.

For example, in FIGS. 2a-7, the return mechanism 38 is an extension spring connected to the bottom of the distal half 20c of the structure 20, a spring load in the pivot tube 20a, or more preferably the combination of the two. When the actuator 18 causes the structure 20 to swing clockwise, the spring 38 is caused to store energy by stretching. Thus, the actuation force generated by the element 14 is greater than the spring modulus of the spring 38. Upon deactivation, the spring 38 overcomes the modulus of elasticity of the deactivated wire 14, such that it causes the wire 14 to stretch and the structure 20 to swing back towards the original (e.g., horizontal) position. It is appreciated that the superelastic strain experienced by the wire 14 accelerates phase transformation back to the martensitic state.

The preferred system 10 includes a zero-power hold locking mechanism 40 coupled to the moveable structure 20. The locking mechanism 40 holds the structure 20 in the manipulated position, even after the actuator element 14 is deactivated, and may be used to hold the structure 20 in either the horizontal or sloped position depending upon use. For example, as previously mentioned, where stored energy actuation is employed (FIG. 8), the locking mechanism 40 works to retain the structure 20 in the horizontal position, and functions as the release to actuation.

In FIG. 7, the locking mechanism 40 includes a "toothed" gear 42 fixedly coupled at one end of the pivot tube 20a, so as to be concentrically aligned with the axis. A pawl 44 is operable to selectively engage the gear 42, so as to prevent relative motion. An active material element 46 (e.g., SMA wire) is connected to the pawl 44 and configured to cause the pawl 44 to disengage the structure 20. Finally, a return (e.g., an extension, compression, or torsional spring, etc.) 48 functions antagonistically to the disengaging element 46, so as to bias the mechanism 40 towards the non-actuated position (FIG. 7).

Alternatively, the locking mechanism 40 may include first and second active material elements (not shown) that when activated cause the mechanism 40 to engage and disengage the structure 20, respectively. In yet another alternative, a gear bar or splined shaft (also not shown) may be utilized, wherein a two-way element 46 is configured to unlock, and then relock the ramp 10 at the desired position. When the locking mechanism 40 is released, the ramp 10 is able to be manipulated manually (e.g., by the weight of the occupant) or via the actuator 18.

Figure 9A:
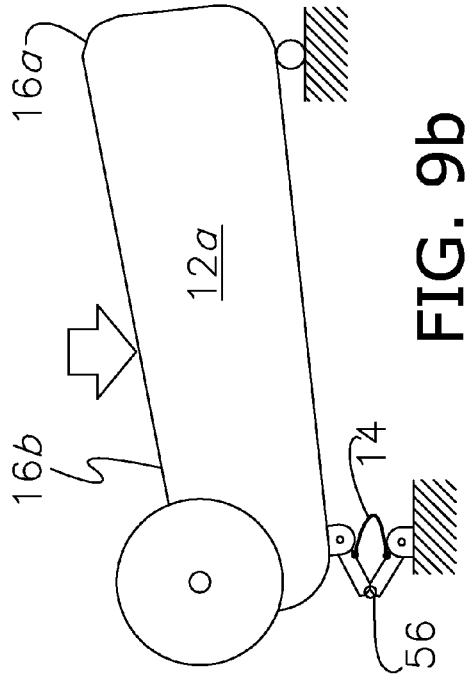
FIG. 9a is a partial side elevation of a ramp adjustment system including a seat base defining a distal pivot axis, a chevron supporting the base in a locked position, and a shape memory wire drivenly coupled to the chevron, in accordance with a preferred embodiment of the invention.
Figure 9B:
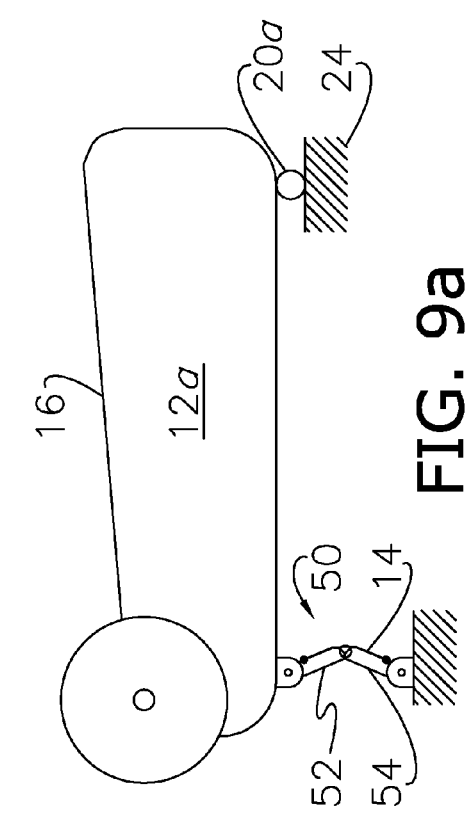
FIG. 9b is a partial side elevation of the system shown in FIG. 9a, wherein the chevron has been reconfigured, so as to be caused to collapse, and the base is recessed by a load, as a result of activating the wire.

In FIGS. 9a-12b exemplary embodiments of the system 10 are shown, wherein the base 12a itself is manipulable and defines a pivot axis at the distal edge 16a. Here, the actuator 18 may be configured solely to free the proximate region 16b, so that the weight of the occupant or resting load upon the seat 12 causes the base 12a to recess. In a first example, a collapsible chevron 50 comprising first and second pivotally connected panels, 52,54 is configured to support the base 12a under the proximate region 16b (FIGS. 9a,b). The chevron 50 is shiftable between a (preferably spring biased) standard position, where it is locked to support the base 12a, and an actuated position, where it is free to collapse. A shape memory wire 14 is connected to the panels 52,54 and straddles the joint 56 formed thereby. When activated, the wire 14 pushes the joint 56 past the vertical plane, and to the actuated position. It is appreciated that slack forms in the wire 14, once the height of the chevron 50 becomes sufficiently reduced (FIG. 9b). By lifting the load, the chevron 50 may be manipulated manually or via a return 38, back to the locked standard position.

Figure 10A:
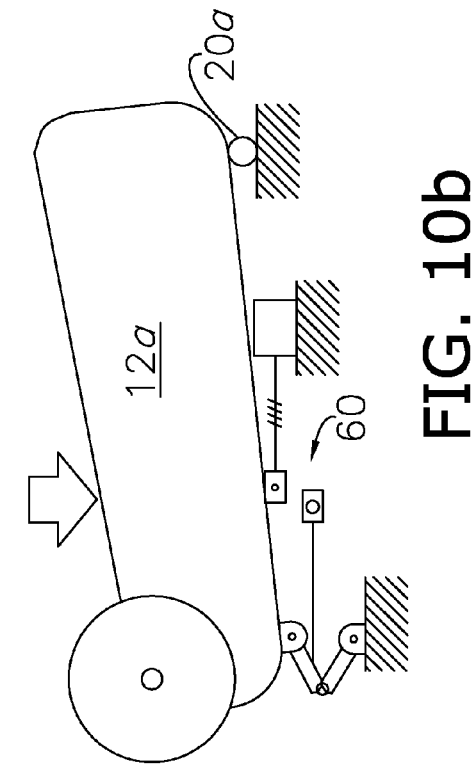
FIG. 10a is a partial side elevation of a ramp adjustment system including a seat base defining a distal pivot axis, a chevron coupled to a drive, so as to support the base, and a shape memory driven connector interconnecting the chevron and drive, in accordance with a preferred embodiment of the invention.
Figure 10B:
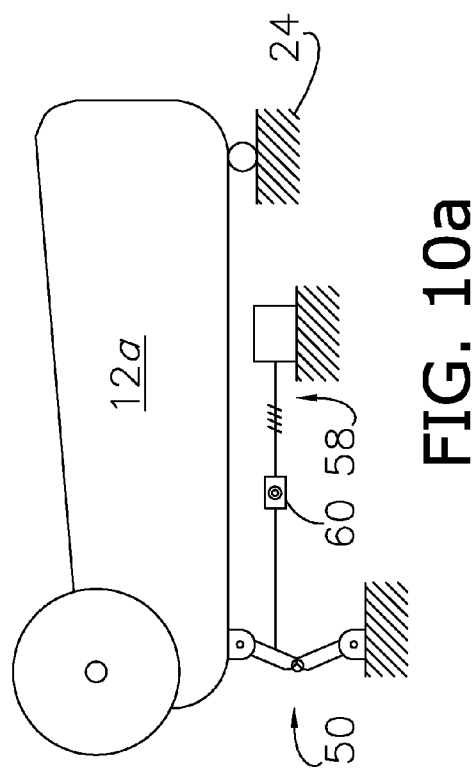
FIG. 10b is a partial side elevation of the system shown in FIG. 10a, wherein the chevron has been disconnected from the drive, so as to be free to collapse, as a result of activating the wire.
Figure 11A:
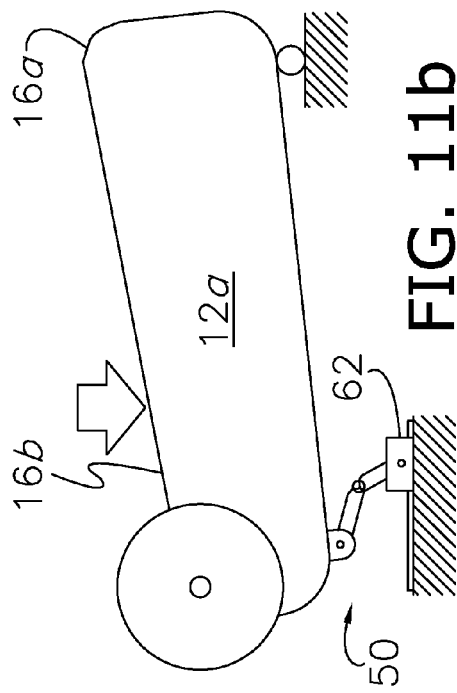
FIG. 11a is a partial side elevation of a ramp adjustment system including a seat base defining a distal pivot axis, and a chevron supporting the base and pivotally connected to a shape memory driven shoe entrained by a track, in accordance with a preferred embodiment of the invention.
Figure 11B:
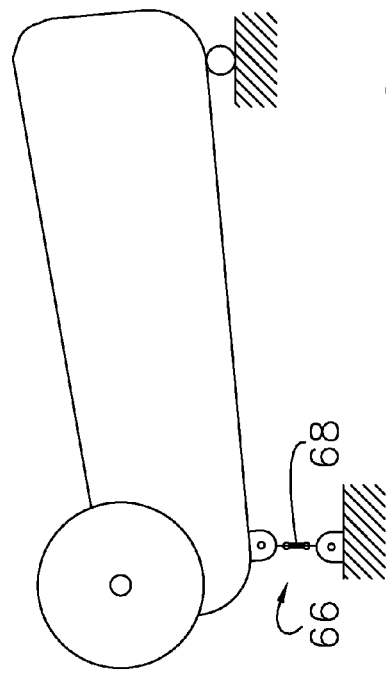
FIG. 11b is a partial side elevation of the system shown in FIG. 11a, wherein the shoe has been activated so as to be free to translate along the track, thereby enabling the base to recede.
Figure 12A:
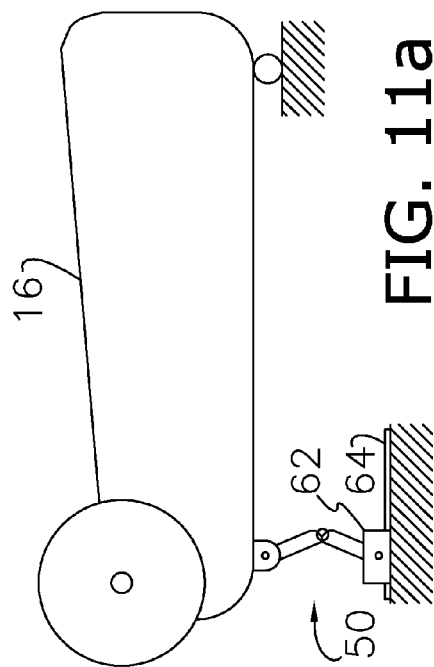
FIG. 12a is a partial side elevation of a ramp adjustment system, including a seat base defining a distal pivot axis, and an active material driven adjustable support link comprising (in enlarged caption view) a male prong and female sleeve inter-coupled by an extension spring and securable by a ball detent in one of two positions, in accordance with a preferred embodiment of the invention.
Figure 12B:
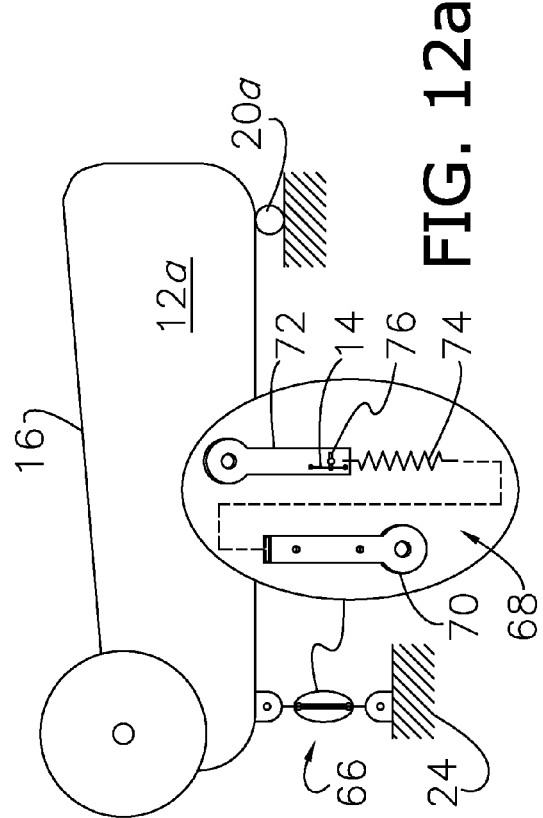
FIG. 12b is a partial side elevation of the system shown in FIG. 12a wherein the active material in the link has been activated, so as to allow stored energy to be released by the spring, the link to shorten, and the base to recede as a result thereof.

Another exemplary configuration involves disconnecting the chevron 50 from its drive (e.g., motor, screw, etc.) 58 and support, so as to provide instantaneous collapsibility (FIGS. 10a,b). Here, the chevron 50, in an otherwise collapsible state, is connected to the drive 58 by an SMA released ball detent connector 60. When the SMA material is in the deactivated state, the connector 60 is engaged to complete the coupling, so that the chevron 50 and base 12a are supported. When activated, the SMA material causes the ball detent to retract, and the connector 60 to disengage the drive 58 (FIG. 10b). This frees the chevron 50 and base 12a to collapse under the weight of the occupant and added G-force that may occur during a crash event. Alternatively, and as shown in FIGS. 11a,b, a shoe 62 can replace the connector 60. The shoe 62 is preferably entrained by a track 64 so as to be linearly moveable when free, and includes an SMA driven ball detent operable to selectively secure the shoe 62 to the track 64. When the SMA material is activated, the shoe 62 enabled to translate, such that the now footingless chevron 50 is caused to collapse under the load.

Finally, in another embodiment, the chevron 50 may be replaced by an adjustable link 66, wherein the link 66 includes an SMA released coupling 68 that is shiftable between normal and spring biased declined positions. More particularly, the coupling 68 includes a female sleeve 70, male prong 72 and extension spring 74 interconnecting the two. In the normal position, the coupling 68 presents a first length; and in the declined position a second length shorter than the first. Again, a ball detent 76 is secured to one of the sleeve 70 and prong 72, and configured to enter one of first and second openings representative of the positions and defined by the other of the sleeve 70 and prong 72, so as to lock the coupling 68 in the desired position. The coupling 68 further includes an active (e.g., SMA) material, that when activated, causes the detent 76 to retract, which enables the extension spring 74 to release its energy. This augments the weight of the occupant in driving the base 12a towards a reclined configuration.

In operation, it is appreciated that a signal source 78 (e.g., power supply) is communicatively coupled to the element 14 and operable to generate a suitable activation signal to activate the element 14 (FIGS. 2a,c). For example, where a Joule heating signal is to be applied in an automotive setting, the source 78 may consist of the charging system of a vehicle, including the battery, and the element 14 may be interconnected thereto, through leads 80 (FIG. 2a), or through suitable short-range wireless communication (e.g., RF, etc.). Alternatively, the source 78 may include a capacitor fed by a low current supply, e.g., a plurality of piezoelectric elements operatively positioned relative to the surface 16, so as to be self-contained. Though fed over an extended period, the capacitor is operable to rapidly release sufficient current for actuation. A switch or otherwise input device 82 communicatively coupled to the element 14 and source 78 (FIG. 2a) may be used to close the circuit, resulting in the activation of the associated element.

More preferably, the switch 82 may be replaced or supplemented by a controller 84 and at least one sensor 86 communicatively coupled to the controller 84 (FIG. 2c). The controller 84 and sensor(s) 86 are cooperatively configured to selectively cause actuation when a pre-determined condition is detected. For example, it is envisioned that at least one vehicle crash sensor 86 may be employed, such that the controller 84 is able to detect an actual and/or predict an imminent crash event. In this configuration, the controller 84 causes the ramp 10 to actuate only when the event is determined, and preferably overrides the input device 82. This presents a submarining countermeasure, wherein the ramp 10 is automatically deployed (lead edge rotated upward) in a crash event or in anticipation of such an event. Here, it is appreciated that fast acting materials, such as SMA, are preferably employed; and an overload protector 30 is preferably omitted, so that the maximum generated actuation force is attainable by the wire 14.

In another example, at least one load cell sensor 86 may be utilized in association with the seat base 12a. In this configuration, the ramp 10 is autonomously manipulated upon application and/or removal of a minimum force (e.g., the weight of the average child occupant). It is appreciated that suitable algorithms, processing capability, and sensor selection/inputs are well within the skill of those in the art in view of this disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. An adjustable seat ramp adapted for use with a seat base defining an engagement surface, wherein the surface defines a distal edge and an interior region, and the edge and region cooperatively define a first height, said ramp comprising:

a moveable structure disposed within the base, presenting a first position and orientation relative to the surface; and an actuator drivenly coupled to the moveable structure and including an active material element operable to undergo a reversible change when exposed to or occluded from an activation signal, wherein the actuator is configured to cause the moveable structure to translate to a second position or orientation and the moveable structure and base are cooperatively configured to modify the edge or region, so as to define a second height therebetween, as a result of the change, the actuator further includes an overload protector connected to the active material element opposite the moveable structure, and configured to present a secondary work output path, when the active material element is activated and the moveable structure is unable to be moved, the overload protector includes an extension spring in series connection to the active material element, the protector further includes a lever intermediate the active material element and spring, the lever defines first and second arms and a pivot axis, the active material element is attached to one of said arms and spaced from the axis a first distance, and the spring is attached to the other of said arms and spaced from the axis a second distance greater than the first.

2. The ramp as claimed in claim 1, wherein the active material element is a shape memory alloy wire.

3. The ramp as claimed in claim 2, wherein the moveable structure includes a panel and a pivot tube fixedly connected to the panel and rotatably coupled to a fixed member distending therefrom, and the wire is connected to the panel and to the fixed member at a point spaced from the tube.

4. The ramp as claimed in claim 1, wherein the base includes a flexible outer covering section configured to facilitate the movement of the moveable structure to the second position or orientation.

5. The ramp as claimed in claim 1, further comprising a locking mechanism configured to engage the structure when in the second position or orientation, so as to retain the locking mechanism in the second position or orientation, when the change is reversed.

6. The ramp as claimed in claim 5, wherein the locking mechanism includes a second active material element operable to undergo a second change when exposed to an activation signal, and configured to cause the locking mechanism to disengage the structure, as a result of the change.

7. The ramp as claimed in claim 1, further comprising
a return mechanism drivenly coupled to the moveable structure antagonistically to the actuator, and producing a biasing force less than the actuation force, such that the locking mechanism causes the moveable structure to move to the first position when the active material element is deactivated and allows the actuator to drive the moveable structure to the second position when the active material element is activated.

8. The ramp as claimed in claim 7, wherein the return mechanism is selected from the group consisting essentially of compression, extension, leaf, torsion, hydraulic/pneumatic springs, elastomeric components, counterweights, and a second active material element.

* * * * *